(No Model.) 2 Sheets—Sheet 1.
L. T. ROBINSON.
MEANS FOR MEASURING ELECTRIC CURRENTS.
No. 516,839. Patented Mar. 20, 1894.
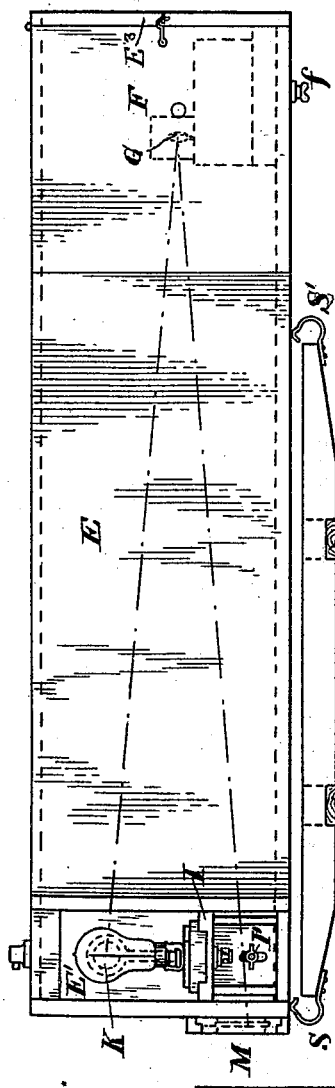
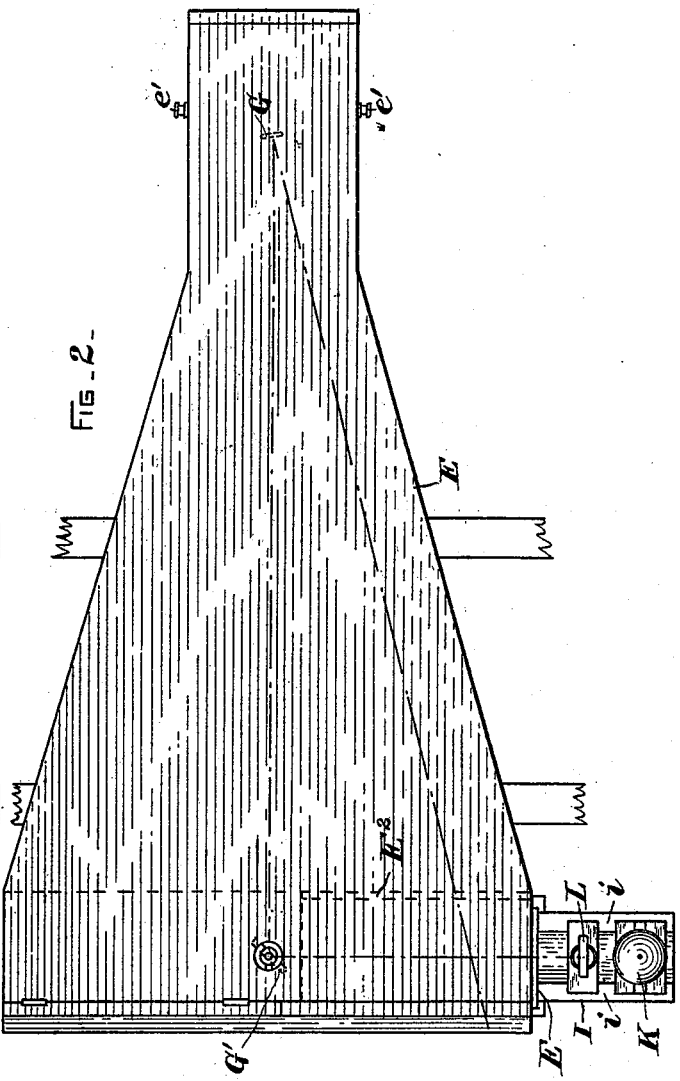
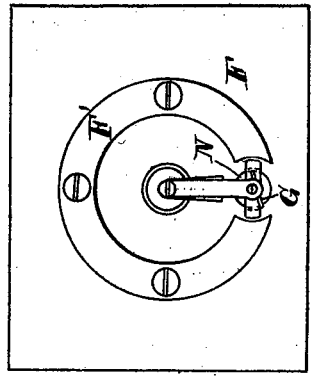
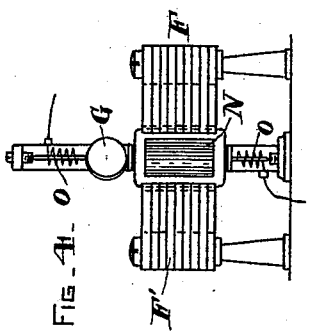
WITNESSES.
Alec F. Macdonald.
W. H. Bentley.
INVENTOR
Lewis T. Robinson,
By Bentley & Blodgett
Attys.

(No Model.) 2 Sheets—Sheet 2.
L. T. ROBINSON.
MEANS FOR MEASURING ELECTRIC CURRENTS.
No. 516,839. Patented Mar. 20, 1894.
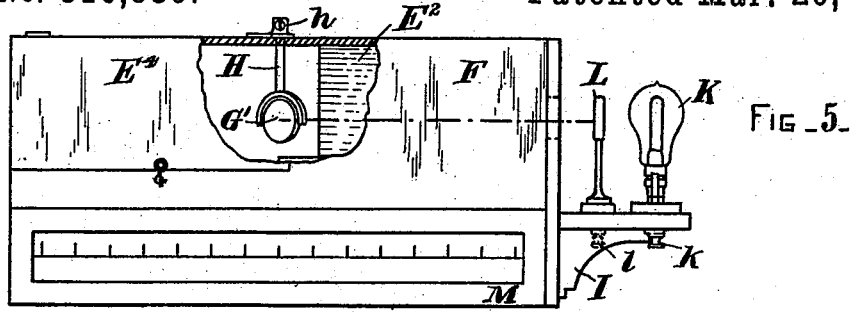
Fig. 5.
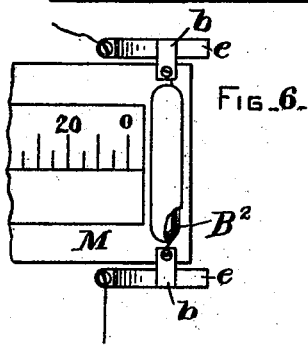
Fig. 6.
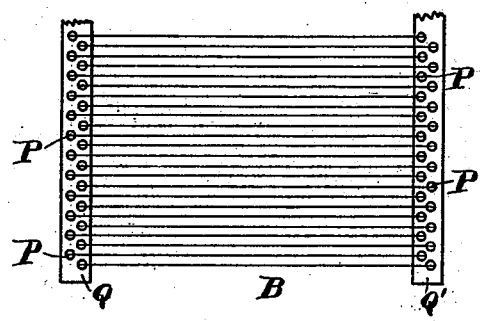
Fig. 7.
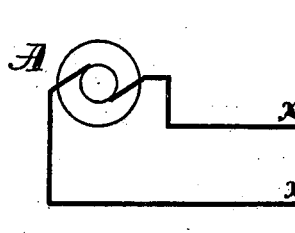
Fig. 8.
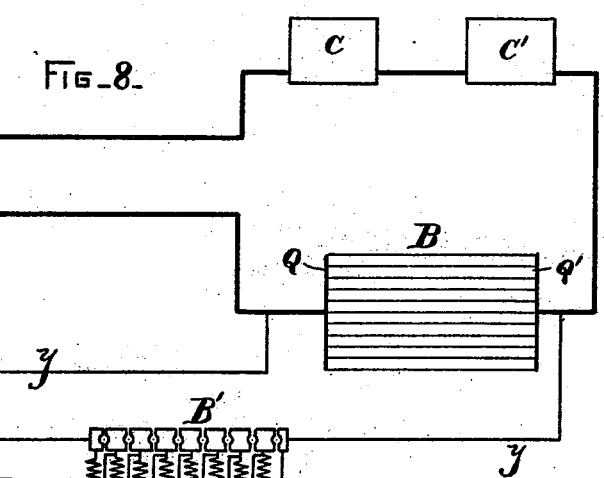
Fig. 9.
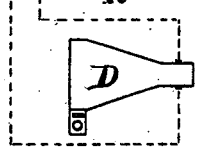
Witnesses.
Alec F. Macdonald.
W. H. Bentley.
Inventor—
Lewis T. Robinson,
By Bentley & Blodgett,
Attys.

UNITED STATES PATENT OFFICE.

LEWIS T. ROBINSON, OF MIDDLETOWN, CONNECTICUT, ASSIGNOR TO THE SCHUYLER ELECTRIC COMPANY, OF CONNECTICUT.

MEANS FOR MEASURING ELECTRIC CURRENTS.

SPECIFICATION forming part of Letters Patent No. 516,839, dated March 20, 1894.

Application filed August 24, 1893. Serial No. 483,907. (No model.)

*To all whom it may concern:*

Be it known that I, LEWIS T. ROBINSON, a resident of Middletown, in the county of Middlesex and State of Connecticut, have invented certain new and useful Improvements in Means for Measuring Electric Currents, of which the following is a specification.

The invention relates to instruments for measuring the quantity of an electric current, or in other words the number of amperes flowing in a given circuit. It is especially adapted to the calibration of current indicators, or ammeters, but it is equally capable of use in measuring or indicating the current delivered by a dynamo, and hence the instrument is itself an efficient ammeter. The principle upon which it is based is that of measuring the fall of potential over a known resistance. I prefer to use for this purpose a dead beat galvanometer in shunt around said resistance, and to magnify the indications of the galvanometer by means of a ray of light reflected from a mirror on the galvanometer needle to a scale placed at a suitable distance therefrom.

In the accompanying drawings, Figure 1 is a side elevation of an apparatus embodying my invention. Fig. 2 is a top plan view of the same. Fig. 3 is a top plan of the galvanometer. Fig. 4 is an elevation thereof. Fig. 5 is a front view of the apparatus. Fig. 6 is a detail showing one end of a scale. Fig. 7 shows the main resistance. Fig. 8 is a diagram of the circuits, and Fig. 9 is a diagram showing the application of the invention as an ammeter for three separate dynamo circuits.

Referring first to Fig. 8, let A be a dynamo supplying current to mains $x$, which are connected in series with the main rheostat B of known resistance, and with the instruments $c\,c'$ to be calibrated. A shunt circuit $y$ around the rheostat B includes the improved measuring instrument D, and a variable resistance B'. By adjusting the two resistances so that a maximum given current will deflect the galvanometer to the end of the scale, and dividing the scale into a certain number of parts proportional according to the law of deflection of the instrument, it then becomes possible to determine the strength of any current up to the maximum. For example, assume that the main rheostat has a resistance of .01 ohm and has a carrying capacity of one hundred amperes without unduly altering its resistance. Let the galvanometer have a resistance of one ohm, and be deflected to the end of the scale with a current of .01 ampere. By passing a current of one hundred amperes through the main rheostat, the difference in potential between the ends of the rheostat is one volt. If the variable rheostat B' is adjusted to ninety-nine ohms (making with the galvanometer one hundred ohms in the circuit $y$) the current flowing through said circuit $y$ will be .01 ampere, which will deflect the galvanometer to the end of its scale. If the current flowing in the main circuit $x$ should be unknown, but it is observed that the galvanometer indicates 75 on its scale of 100, and the resistance of its circuit $y$ remains at one hundred ohms, then the amperes in the galvanometer circuit must be .0075, and the voltage in the main circuit must be .75 volts and the current that must flow through the main rheostat to fulfill these conditions is seventy-five amperes, which is what the galvanometer indicates. With the above described arrangement, the amperes required to bring the deflection to the end of the scale are equal to the number of ohms in the galvanometer circuit. I do not, however, limit myself to any particular amount of resistance, either in the main circuit or in the galvanometer circuit, but I prefer to arrange the apparatus to indicate amperes, or any convenient multiple thereof. When the current to be measured is very small, it can be passed directly through the galvanometer, dispensing with the main rheostat, B.

The measuring apparatus D comprises several novel features. It consists of a box E, preferably fan-shaped, as shown, containing at its small end a dead beat galvanometer F, whose needle carries a mirror G. At the wide front end of the box is another mirror G' pivotally suspended in the fork of a hanger H which is rotatably mounted in a bearing in the top of the box and can be fastened by a set screw $h$ after being turned to give the mirror G' the proper angular adjustment.

On a bracket I at one side of the box are supported a lamp K and a lens L, each being adjustable along guides $i$ on the bracket, and having set screws $k\, l$ to fasten them. The bracket is vertically adjustable on the box and can be held at any desired height by the thumb screw I'. A vertical slit is cut in a slide E' covering an opening in the side of the box. The light from the lamp is concentrated by the lens upon the slit, through which it passes to the mirror G', and thence to the mirror G on the galvanometer, whence it is reflected to the scale M which extends across the front of the box. A partition $E^2$ depending from the top and parallel with the front of the box prevents the entering ray of light from shining elsewhere than on the mirror G'. Doors $E^3$ $E^4$ are provided at either end of the box to give access to the galvanometer and to the mirror G'. The scale M is preferably a strip of ground glass, suitably graduated, and in order to adapt the instrument to different ranges of work, removable scales may be used, graduated in accordance with the work required. Each scale has marked on it the range for which it is intended, and on the slide which carries it may be mounted a fixed resistance $B^2$ whose terminals are connected to contacts $b$, adapted to engage with contact plates $e$ on the box, which are in circuit with the galvanometer. In this way, the resistance of the galvanometer circuit is so altered that the instrument gives a correct reading for the scale so inserted. The great advantage of this construction is that it enables the instrument to be used by a person who does not understand the relations that one part must bear to another.

The galvanometer F is mounted on slides arranged to give it freedom of adjustment in all directions. It is fastened, when adjusted, by means of a wing nut $f$. Electrical connection is made with it by means of the binding posts $e'$, which are connected with the galvanometer coil N by means of the helical springs O which tend to hold the mirror G in its normal position.

The field magnets F' may be of any suitable construction.

The main rheostat B is preferably composed of strips of high resistance material supported at each end by a plug P inserted in a metal bar Q, Q', whereby the several strips are disposed in multiple arc. The main line terminals are connected respectively with the bars Q, Q'. The rheostat may be immersed in oil or other insulating fluid to keep it at as uniform a temperature as possible. In making accurate measurements, the temperature of the oil can be readily ascertained and allowed for. It is preferred to make the rheostat and galvanometer coil all of the same material, in order to reduce to a minimum the room error, since all these parts will be similarly and equally affected.

In Fig. 9, the shunt circuits from three dynamos are brought to adjacent pairs of contacts R, R' $R^2$, with any one of which pairs an instrument D can be placed in circuit as indicated in dotted lines, for the purpose of determining the output from either of the dynamos. The box E is preferably mounted on springs S S' to absorb the vibration which is common in a factory or a power station. This makes the instrument practical for all kinds of locations.

The range of this instrument has practically no limit, depending solely on the resistance used, and the sensitiveness of the galvanometer. It can be arranged to measure any current from one one-hundredth of an ampère or less up to many thousand ampères.

Having thus described my invention, what I claim is—

1. The combination with a dark box, of a reflecting galvanometer at one end, a transparent scale at the other end, and a lamp.

2. The combination with a dark box, of a reflecting galvanometer at one end, a transparent scale at the other end, a lamp adjacent to such scale but screened from the galvanometer, and a mirror arranged to throw a ray of light upon the galvanometer, substantially as described.

3. The combination with a dark box, of a reflecting galvanometer adjustably mounted at one end thereof, a transparent scale at the other end of the box, a lamp adjacent to said scale, and an adjustable mirror for throwing a ray of light upon the galvanometer, substantially as described.

4. The combination with the box E, of a vertically adjustable bracket I at one side, a lamp mounted on said bracket, a slide E' containing a slot, a mirror G', and a reflecting galvanometer, substantially as shown and described.

5. The combination with the box E, of a vertically adjustable bracket at one side of the same, a lamp and a lens adjustably mounted on said bracket, a slitted slide E', an adjustable mirror G', and a reflecting galvanometer.

6. In an electrical measuring instrument, the box E, having a door at each end, a partition $E^2$ depending from the top parallel with and near one end, an adjustable bracket at one side, and a transparent scale across one end, below the partition.

7. In an electrical measuring instrument, a removable scale provided with a resistance.

8. The combination with the box E containing a galvanometer and provided with contact plates in circuit therewith, of a removable scale carrying a resistance having contact plates adapted to connect with those on the box when the scale is in place.

In testimony whereof I hereunto set my hand in the presence of two witnesses.

LEWIS T. ROBINSON.

Witnesses:
E. S. BIRDSALL,
GEO. A. MCKAY.